(12) United States Patent
Chopra et al.

(10) Patent No.: US 9,323,760 B1
(45) Date of Patent: Apr. 26, 2016

(54) INTELLIGENT SNAPSHOT BASED BACKUPS

(71) Applicant: EMC Corporation, Hopkinton, MA (US)

(72) Inventors: Shelesh Chopra, Bangalore (IN); Eric Christian Matthies, Millis, MA (US); Christopher Francis Wroten, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 298 days.

(21) Appl. No.: 13/841,234

(22) Filed: Mar. 15, 2013

(51) Int. Cl.
*G06F 17/30* (2006.01)

(52) U.S. Cl.
CPC ................................ *G06F 17/30088* (2013.01)

(58) Field of Classification Search
None
See application file for complete search history.

(56) References Cited

U.S. PATENT DOCUMENTS

| | | | |
|---|---|---|---|
| 7,650,533 B1 * | 1/2010 | Saxena et al. | 714/6.12 |
| 8,095,751 B2 * | 1/2012 | Garimella et al. | 711/162 |
| 8,589,350 B1 * | 11/2013 | Lalonde et al. | 707/639 |
| 8,756,386 B2 * | 6/2014 | Tokoro | 711/162 |
| 2005/0182910 A1 * | 8/2005 | Stager et al. | 711/162 |
| 2006/0282627 A1 * | 12/2006 | Aggarwal et al. | 711/154 |
| 2007/0204120 A1 * | 8/2007 | Garimella et al. | 711/162 |
| 2007/0208918 A1 * | 9/2007 | Harbin et al. | 711/162 |
| 2008/0034307 A1 * | 2/2008 | Cisler et al. | 715/764 |
| 2008/0235016 A1 * | 9/2008 | Paul et al. | 704/246 |
| 2009/0031097 A1 * | 1/2009 | Nelson | 711/162 |
| 2010/0169597 A1 * | 7/2010 | Yonezawa et al. | 711/162 |
| 2012/0123999 A1 * | 5/2012 | Ashutosh et al. | 707/618 |
| 2012/0124012 A1 * | 5/2012 | Provenzano | G06F 17/30162 707/692 |

* cited by examiner

*Primary Examiner* — Wilson Lee
(74) *Attorney, Agent, or Firm* — Staniford Tomita LLP (57) ABSTRACT

This disclosure relates to a method, article of manufacture, and apparatus for intelligently determining snapshot method during snapshot based backup. In some embodiments, this includes at a second time instance, calculating a data change rate since a first time instance, obtaining policies, wherein each of the policies specifies a backup method and one or more corresponding conditions, determining a snapshot method based on the data change rate and the policies, and performing a snapshot using the snapshot method.

20 Claims, 8 Drawing Sheets

FIG. 1

From T0 to T1:
Host A Source 1: 0% data change rate, Host A was down for maintenance
Host B Source 2: 10% data change rate

INTELLIGENT SNAPSHOT BASED BACKUPS

CROSS-REFERENCE TO RELATED APPLICATIONS

This application is related to co-pending U.S. patent application Ser. No. 13/841,717 for INTELLIGENT PAIRING FOR SNAPSHOT BASED BACKUPS, U.S. patent application Ser. No. 13/842,710 for INTELLIGENT PAIRING USING A LOOKUP DATABASE FOR SNAPSHOT BASED BACKUPS, U.S. patent application Ser. No. 13/843,109 for INTELLIGENT CONFIGURATION FOR SNAPSHOT BASED BACKUPS, all filed Mar. 15, 2013, and filed concurrently herewith, which are incorporated herein by reference for all purposes.

FIELD

The present invention relates generally to computer systems and specifically to systems and methods of backing up data on computer systems.

BACKGROUND

Snapshot based backups have been in play for some time and are gaining traction at a swift pace. There are different snapshot based backup methods. Each of these methods has specific use cases. For example, if data changes less frequently, SNAP method may be recommended. On the other hand, if data changes often, clone or mirror may be preferred.

Currently, the choice of snapshot based backups may be made manually based on experience or random approaches. The manual approach has several drawbacks. First, data change rate may fluctuate. Having a fixed snapshot method may not be ideal or optimized over time. For example, SNAP may be a good choice on a day when data changes very little, but may not be optimal next day, when the data change rate is more than 50%. Further, on a day when there is no or very few data changes, unnecessary snapshots may waste system resources. Second, different method may require different configuration, such as different pairing source and target devices pairing and provisioning, among others. Manual configuration may not keep up. Especially relative to traditional backups, it is common for snapshots to be taken with higher frequency. For example, some snapshot operations may be configured to run every 15-30 minutes. It is impractical to examine the data change rate, then manually choose snapshot method and configure a backup system every 15-30 minutes. Thus, traditional approach of managing snapshot based backups without any intelligence built-in is both inadequate and inefficient.

There is a need, therefore, for an intelligent snapshot based backup method and system.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules.

Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

Disclosed herein are methods and systems of intelligent snapshot based backups. Storage is widely used for storing data associated with computer systems. Storage may be primary storage used for routinely accessed information, or secondary storage providing redundant or archival storage for data recovery in case of data loss in the primary storage system. Examples of primary storage include systems referred to as "production", "source", or "working" data storage systems. Examples of secondary storage include systems referred to as "backup" or "target" systems.

Conventional data storage may be performed by storage systems including one or more storage devices. These devices may be arranged into one or more storage volumes. Storage devices may be, for example, disk devices that store data on one or more types of media, including magnetic, optical, or other type of media used for storing data. More particularly, disk devices may be arranged into one or more data storage areas, referred to in the art as "volumes" that are capable of being accessed by one or more computer systems, referred to as "hosts." A host may be a client or a server. A volume may be commonly defined as a virtual storage area into which a file system, database management system, or other system or process places data. A volume may include a single partition of a disk device or multiple partitions located on one or more physical storage devices. Generally, volumes are managed by the storage systems which are computer systems that provide storage-related services to hosts. The hosts communicate with a storage system through a communication medium such as a network. Typical networks used to transfer data between hosts and storage systems include Fibre Channel, SCSI, Ethernet, Gigabit Ethernet, and other types of communication networks. Data is transferred between systems using one or more communication protocols as is well-known in the art.

Figure 1:
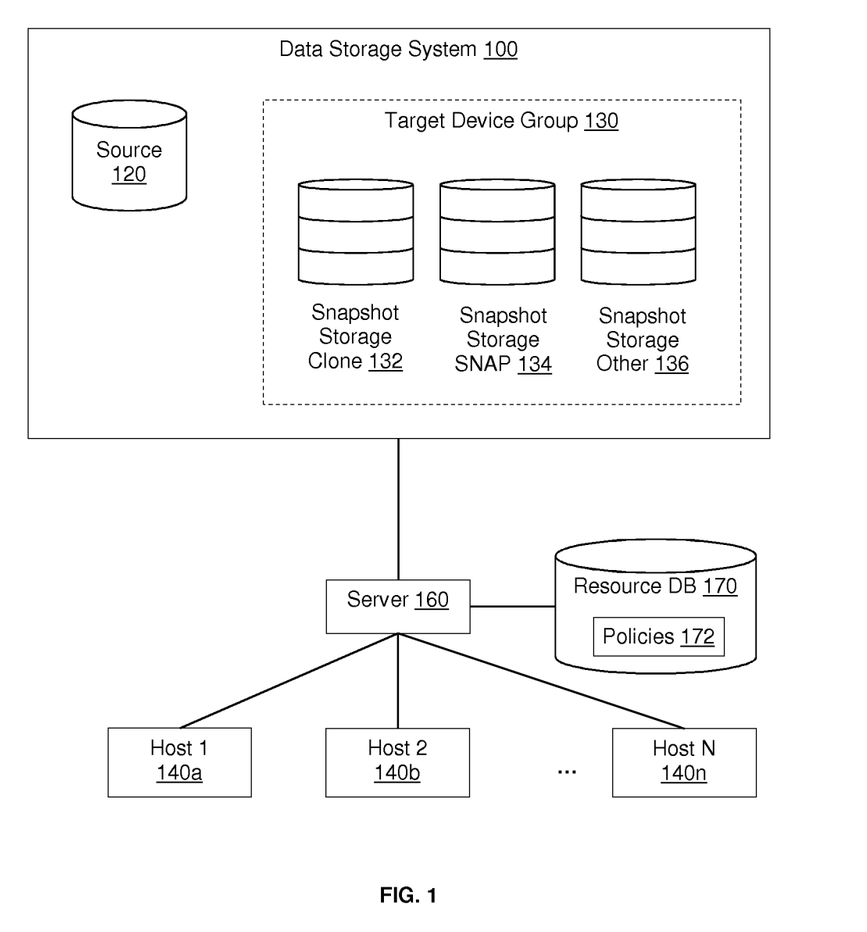
FIG. 1 is a block diagram of a storage system for snapshot based backups in accordance with some embodiments.

Referring to FIG. 1, shown is a system level block diagram illustrating one embodiment that may be used in connection with performing the techniques described herein. A plurality of data blocks may be generated and accessed by a plurality of Hosts 140a-140n. Hosts 140a-140n and Server 160 may access Data Storage System 100, for example, in performing input/output (I/O) operations, data requests, and other operations. Data Storage System 100 may store data on Source 120 and Target Device Group 130. Target Device Group 130 may include one or more Snapshot Storages 132-136 that may be paired to Source 120. During an intelligent snapshot based backup, Source 120 and one or more devices from Target Device Group 130 may be paired, so that Source 120 may be used for routinely accessed information, and the one or more devices from Target Device Group 130 may be used to provide redundant or archival storage.

In some embodiments, Target Device Group 130 may include devices that may be used for snapshot storage. Target Device Group 130 may be configured to include different types of snapshot storage, such as Snapshot Storage Clone 132, Snapshot Storage SNAP 134, and/or Snapshot Storage Other 136, among others. If a device is not in Target Device Group 130, intelligent pairing for snapshot based backups may not use it as a target to pair with Source 120. Although Snapshot Storages 132-136 within Target Device Group 130 are shown in FIG. 1 as being in a data storage location different from Source 120, it should be appreciated that Snapshot Storages 132-136 and Source 120 may be located in and controlled by separate systems, or may be located within and controlled by the same Data Storage System 100. Data may be located in same or different systems, which may be physically within the same physical enclosure, or may be located in different physical enclosures connected by one or more communication links. Further, a device used at a first point-in-time as Source 120 may be configured to be used at a second point-in-time as a device within Target Device Group 130 for storing snapshots. Conversely, a device configured within Target Device Group 130 and used at a first point-in-time for storing snapshots may be used at a second point-in-time as Source 120 for storing production data.

Server 160 may be connected to Hosts 140a-140n and Data Storage System 100 through communication medium for managing the storing of data blocks during snapshot backup operations. The communication medium may be any one or more of a variety of networks or other type of communication connections as known to those skilled in the art. Each of the communication mediums may be a network connection, bus, and/or other type of data link, such as a hardwire or other connections known in the art. For example, the communication medium may be the Internet, an intranet, network or other wireless or other hardwired connection(s) by which Host systems 140a-140n may access and communicate with other components (shown or not shown in FIG. 1). In one embodiment, the communication medium may be a LAN connection or an iSCSI or fibre channel connection.

Each of Host systems 140a-140n and Data Storage Systems 100 may be connected to the communication medium by any one of a variety of connections as may be provided and supported in accordance with the type of communication medium. Similarly, Server 160 may be connected to the communication medium by any one of variety of connections in accordance with the type of communication medium. The processors included in Host computer systems 140a-140n and Server 160 may be any one of a variety of proprietary or commercially available single or multi-processor system, such as an Intel-based processor, or other type of commercially available processor able to support traffic in accordance with each particular embodiment and application.

Although Snapshot Storages 132-136 are shown in FIG. 1 as being in a data storage location included within the same Data Storage System 100 as Source 120, it should be appreciated that Snapshot Storages 132-136 and Source 120 may be located in and controlled by separate systems, or may be located within and controlled by the same Data Storage System 100. Data may be located in same or different systems, which may be physically within the same physical enclosure, or may be located in different physical enclosures connected by one or more communication links. In some embodiments, Server 160 may direct the writing of the snapshot data to different storage devices over a communication medium. It should also be appreciated that one or more physical storage devices (e.g., disk drives) may be used to create a volume, and that snapshot operations may involve copying between sets of storage devices. Other configurations of a storage system are possible that are within the spirit and scope of the invention. For example, although FIG. 1 shows volumes including one or more disks, it should be appreciated that any storage device may be used.

An example of a storage system on which aspects of the present invention may be implemented is the Symmetrix line of storage systems available from EMC Corporation, Hopkinton, Mass. Another example of a storage system on which aspects of the present invention may be implemented is the CLARiiON line of storage system, also available from EMC Corporation, Hopkinton, Mass. The architecture shown in FIG. 1 is by way of example, as it should be appreciated that embodiments of the invention described herein may be implemented on numerous other architectures.

In some embodiments, a production application residing on Hosts 140a-140n and/or Source 120 may be configured for storing changes that occur in the production application. Each time the production application reads/writes data, the data involved in the read/write operation may be created and stored on Source 120. A series of read/write operations may be performed by Source 120. Source 120 may be able to retain information about every change to a selected application, directory, volume, or the like, over a period of time, and a user may later utilize Source 120 to access stored data.

The present invention may provide for snapshots to be created of the data stored in Source 120 or snapshot volume at various points in time. The snapshots are point-in-time replicas or representations of the original data or contents of one or more volumes. A snapshot may be used to make an actual copy on another local and/or remote storage device. These snapshots may be recovered at a later time by reading the data from a snapshot created at a particular point in time.

Different snapshot methods may be suitable for different production environments. For example, TimeFinder solution, available from EMC Corporation, Hopkinton, Mass., may be used to create snapshots. TimeFinder solution includes various snapshot methods. One snapshot method, TimeFinder/Clone may enable the creation of a full point-in-time copy for backups. As soon as the data has been copied to the clone and split from the source, the clone may be a complete and independent physical copy of the data. Thus, the full copy may be suitable to support high I/O workloads, such as data warehouse refreshes and/or any other process that requires parallel access to production data. Clone copies may be used to reduce disk contention and improve data access speed by assigning users to copies of data rather than accessing the one prod copy.

Another method, TimeFinder/SNAP is a pointer-based, space-saving snapshot solution. TimeFinder/SNAP, for virtual device copy operations, may provide multiple copies of production data for testing, backups or report generation. TimeFinder/SNAP may use a copy-on-first-write technique as a way to conserve disk space when making copies. Only writes to tracks on the source device or target virtual device may cause any incremental storage to be consumed. Relative to TimeFinder/Clone, the space savings using TimeFinder/SNAP may be significant when the production applications change only a small percentage of data on a volume. However, some performance degradation may be expected when production applications change a large percentage of data on a volume. Thus, TimeFinder/SNAP may be suitable to support moderate I/O workloads.

Still referring to FIG. 1, in some embodiments, during an intelligent snapshot backup in accordance with some embodiments, clone may be chosen as a snapshot method. A clone of Source 120 may be created and stored on Snapshot Storage Clone 132 within Target Device Group 130. The clone may later be used to perform a restore operation to Source 120. More particularly, Data Storage System 100 may perform a restore of data from Snapshot Storage Clone 132 to Source 120 upon a request initiated by one or more Hosts 140a-140n.

Data Storage System 100 may also perform other operations, such as splitting one or more Snapshot Storage Clone 132 from Source 120, resynchronizing Snapshot Storage Clone 132 to Source 120, or any other type of operation involving data located on any of volumes within Data Storage System 100.

In another example, SNAP method may be chosen to create a point-in-time copy of Source 120 during an intelligent snapshot backup in accordance with some embodiments. The snapshot created using SNAP method may store the difference between snapshots instead of a full volume copy like a clone would take. Every I/O the user writes to Source 120 may be processed in a copy on a first write (i.e., the older version of the data is moved to a special volume). A read from the snapshot might result in reading from another location in the snapshot volume. As illustrated in FIG. 1, snapshots created using SNAP method may be stored on Snapshot Storage SNAP 134 within Target Device Group 130.

The choice of snapshot method may be based on data change rate and policies rules and/or criteria specified in policies. In the exemplary system of FIG. 1, Sever 160 may probe data change rate on Hosts 140a-140n. Based on the data change rate and Policies 172 stored in Resource Database 170, appropriate snapshot method may be chosen for a specific time period.

In some embodiments, Policies 172 may be stored in Resource Database 170. Among others, Resource Database 170 may store configuration and consumption of system resources at a given time instance. Such information may be related to devices, schedules, hosts, groups and policies, among others. Through value changes in Resource Database 170, settings for backup and recovery among others may be reconfigured. An example of a computer system, which utilizes Resource Database 170 to facilitate system configuration, is Networker, a product available from EMC Corporation, Hopkinton, Mass. Though FIG. 1 illustrates Resource Database 170 to be external to Server 160, Resource Database 170 may reside and operate or to be operated inside or outside Server 160.

A policy may specify goals, metrics and/or priorities, among other parameters. For example, a policy may be presented as one or more conditions and/or constraints that need to be satisfied. In some embodiments, a policy may specify a snapshot method, a condition and/or constraint, and may be expressed as the following form: minimum, maximum, and snapshot method, among others. When the data change rate falls within the range of minimum and maximum, the condition may be considered satisfied and the corresponding snapshot method may be chosen. Simple conditions and/or constraints may be used as building blocks for complex policies. Complex policies may include combinations of disjunctive simple conditions and/or constraints, conjunctive simple conditions and/or constraints, and/or negations of individual simple conditions constraints.

Figure 2:
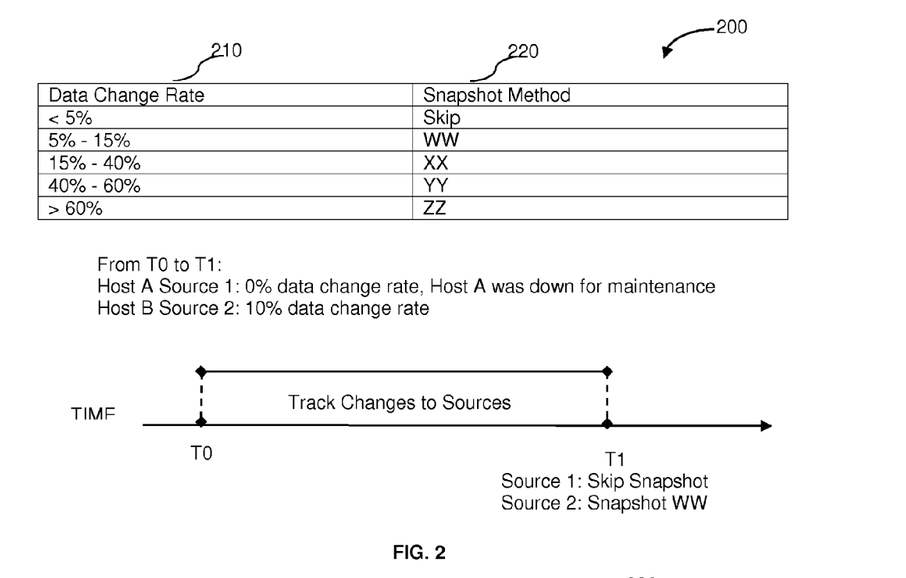
FIG. 2 is a diagram of exemplary policies and the application of policies at various points in time of snapshot based backups in accordance with some embodiments.

FIG. 2 illustrates an exemplary set of policies and the application of the policies to snapshot based backups, in accordance with some embodiments. As shown in table 200, five exemplary policies are created for various snapshot methods. The exemplary set of policies may include the constraints for Data Change Rate 210 and the corresponding Snapshot Method 220. During various time periods, data changes to various sources may be tracked by a server. When a snapshot is configured to be taken, data change rate may be calculated. As shown in FIG. 2, at time T1, when it is time to perform a snapshot based backup, a data change rate for the time period T0 to T1 may be calculated. Policies may then be applied to choose a snapshot method based on the calculated data change rate. Thus, the application of policies, in accordance with some embodiments, makes intelligent choices of snapshot method based on data change rate fluctuation tracked by a server.

For example, Host A may be down for maintenance from T0 to T1. Without any data changes, Source 1 for storing data generated by Host A may have a 0% data change rate from T0 to T1. Applying the set of exemplary policies as shown in table 200, the corresponding Snapshot Method 220 may be to skip the snapshot for Source 1 at T1. In another example, Host B may sometimes write data to Source 2 from T0 to T1, which may result a 10% change rate. Applying the set of exemplary policies as shown in table 200, the corresponding Snapshot Method 220 at T1 for Source 2 may be WW.

Figure 3:
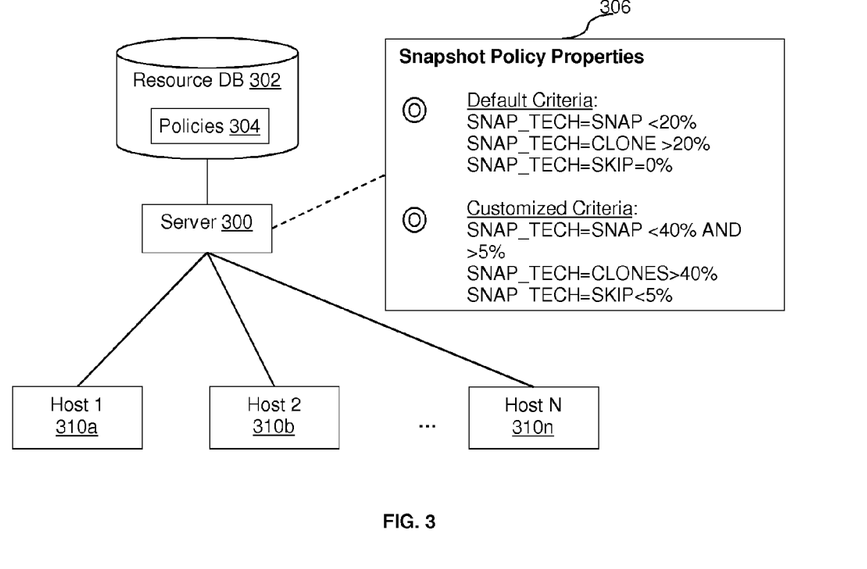
FIG. 3 is a diagram of snapshot policy configuration in a storage system in accordance with some embodiments.

FIG. 3 is a schematic diagram illustrating policy configuration including a user interface, in accordance with some embodiments. In some embodiments, Server 300 may probe the data change rate on Hosts 310a-310n. The data change rate may be calculated at various levels. For example, the data change rate may be calculated at file system level and/or block level using methods, such as change block tracking or archive bit setting, as is well-known in the art. A user may specify policies in a console configuration for Server 300. In some embodiments, a user interface may present the dialog box 306. Default criteria for snapshot policy properties may be checked initially. A selection of the default criteria may result storing a set of default policies and the corresponding snapshot methods in Resource Database 302. Alternatively, the user may specify customized criteria. For each customized criteria, data change rates and the corresponding snapshot methods may be specified and stored in Policies 304. Based on the data change rate obtained by Server 300, applying the set of criteria stored in Policies 304, a snapshot method may be intelligently chosen, in accordance with some embodiments.

Figure 4:
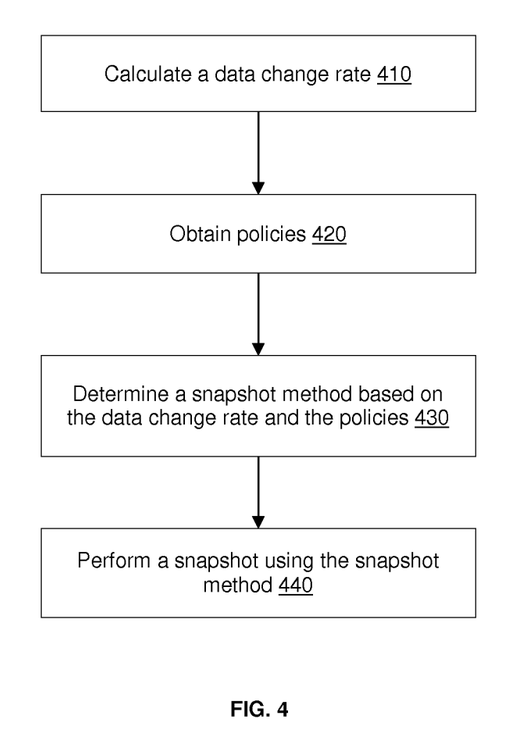
FIG. 4 is a flow chart illustrating a method of intelligent snapshot based backups in accordance with some embodiments.

FIG. 4 is a flowchart illustrating a method of choosing a snapshot method and taking snapshots using the chosen snapshot method, in accordance with some embodiments. In step 410, a data change rate may be obtained. The data change rate at a time instance may be obtained by calculating the amount of data changed during a period. The period may start from a previous time instance, such as the time of a previous snapshot backup, and end at a current time stance, such as the time of a current snapshot backup. Having calculated the data change rate, in step 420, a set of policies may be obtained. The set of policies may specify constraints as well as the corresponding snapshot methods. In step 430, applying the set of policies to the data change rate, a snapshot method may be determined. Subsequently, in step 440, a snapshot based backup may be performed using the chosen snapshot method.

The intelligent snapshot method and system described herein, in accordance with some embodiments, has several benefits. First, the intelligent snapshot method allows intelligent backup decision to be made automatically at each backup. Instead of pre-configured snapshot methods, which never account for the real-time data population patterns, the intelligent snapshot method analyzes the data change rate, then decides the most efficient and effective backup method. Second, using policies, the intelligent snapshot method described herein reduces manual process, thus improves efficiency and accuracy. Instead of manual configuration for each host connected to a server, users now have a centralized location to specify the policies. Further, based on the criteria stated in the policies, different snapshot method may be chosen for different hosts. Therefore the centralized configuration reduces the overhead of managing separate resources at run time.

Once a snapshot method is chosen, one or more target devices need to be paired to the source in order to store snapshots. Many snapshot backup methods in existence today require manual configuration in order to define the relationship between a source and a target. The manual configuration may involve hardcoding of the source and target. The coding depends heavily upon a user's knowledge and experience. Such manual process is leaving too much to chance and interpretation. Disclosed herein is to remove the user dependency and intelligently choose the most efficient target to pair with the source.

Figure 5:
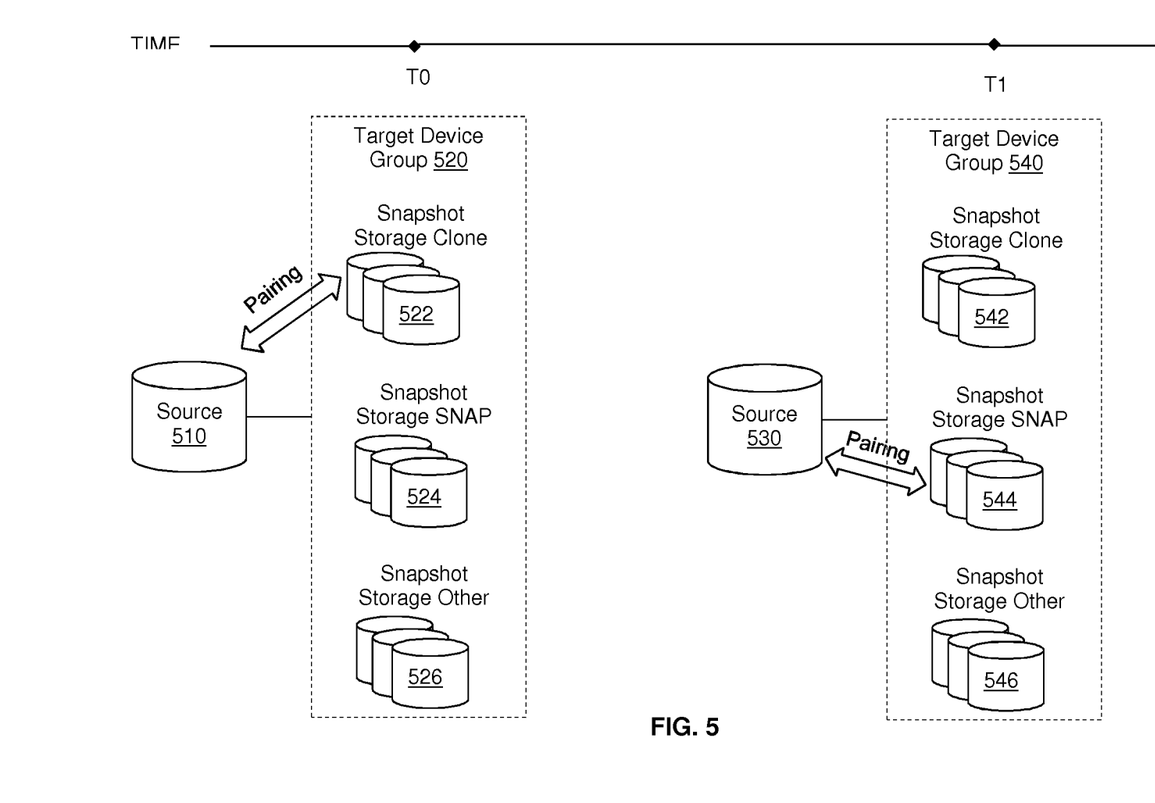
FIG. 5 is a schematic diagram illustrating intelligent pairing at various points in time of snapshot based backups in accordance with some embodiments.

FIG. 5 is a schematic diagram illustrating exemplary source and target pairing at various points in time, in accordance with some embodiments. At each scheduled backup time, snapshot methods may be chosen according to the embodiments described above. For example, at scheduled backup time T0, clone may be chosen as the snapshot method based on a data change rate and policy configuration. Having decided the snapshot method, Source 510 may be intelligently paired with one or more Snapshot Storage Clone devices 522, in accordance with some embodiments. Following the pairing, snapshots may be taken and stored on the one or more Snapshot Storage Clone devices 522 during cloning. At next scheduled backup time T1, SNAP may be chosen as the snapshot method based on the system data change rate and the policy configuration. Having decided on the snapshot method, Source 530 may be intelligently paired with one or more Snapshot Storage SNAP devices 544, in accordance with some embodiments. Following the pairing, snapshots may be taken and stored on the one or more Snapshot Storage Clone 544 devices during SNAP.

In some embodiments, a storage group may be configured to ensure that there are boundaries on the target devices for intelligent pairing. The boundary setup is critical since, without these boundaries, intelligent pairing may pick a target device that looks available and appropriate but is in fact simply a source for some other purpose. Using such a device for pairing may result in data loss. Thus, devices that can be used for pairing may be placed in the storage group, such as Target Device Group 520 and 540 shown in FIG. 5. If a device is not in the storage group, the device may not be used for intelligent pairing, even if that device is already paired to the source. The intelligent pairing of devices including boundary check, in accordance with some embodiments, is further illustrated in FIG. 6.

Figure 6:
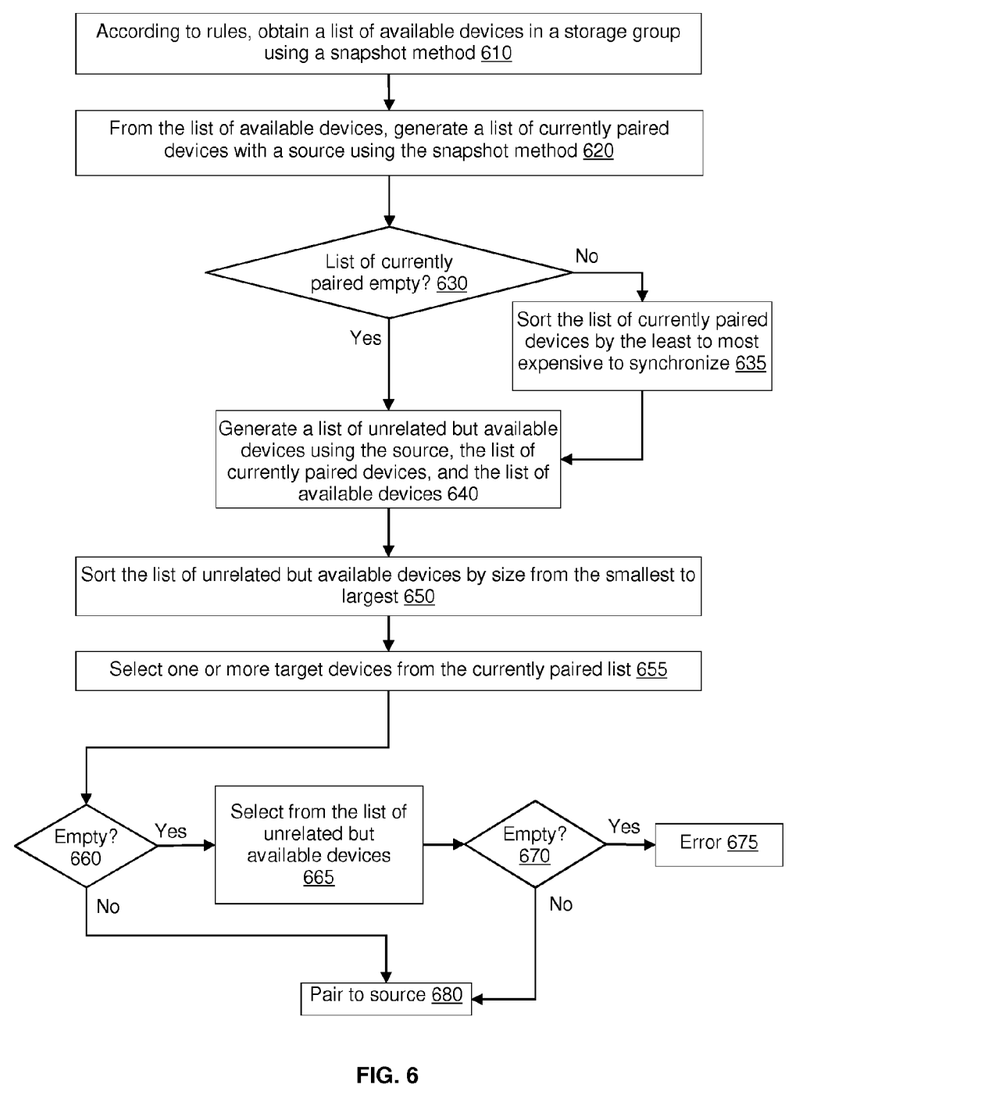
FIG. 6 is a flow chart illustrating intelligent pairing of devices for snapshot based backups in accordance with some embodiments.

FIG. 6 is a flowchart illustrating a method of intelligent pairing, in accordance with some embodiments. Having intelligently determined a snapshot based backup method, a path (i.e. filesystem) to be backed up may be obtained. The path may be made up by a list of source LUNs. For each source LUN, intelligent pairing may be performed. In step 610, a list of devices in a storage group available to a source using the chosen snapshot method may be obtained. In some embodiments, rules may be put in place to specify the criteria of device selection. For example, some criteria may require that a device in the list must be in a storage group, visible, in certain state (ie, ready, not ready), not locked, and/or in an acceptable pair state (ie, split, not paired, etc). After examining the attributes of a device, only the device satisfying the criteria may be placed in the list of available devices.

In some embodiments, since the generation of the available devices list in the storage group can be an intensive amount of work to accomplish, the results may be cached and reused if another request with the same snapshot method is made within a reasonable amount of time, i.e. 60 seconds. The length of the period is reasonable since the likelihood of a change in the results in the period may be quite low.

After generating the list of available devices, in step 620, a list of devices currently paired with the source using the chosen snapshot method may be obtained. The list of devices currently paired with the source may be generated by selecting devices out of the list of available devices. Since the list of devices currently paired with the specified source may be derived from the list of available devices, as a subset of the available devices list, the list of currently paired devices may be empty. For example, some devices may be currently paired to the source, but not available for intelligent pairing due to any of the reasons listed above (i.e. the device is locked, not in the right state etc.) and/or not in the storage group for intelligent pairing. By selecting devices out of the list of available devices, a boundary may be established to ensure that only devices configured within the storage group and in acceptable states according to the rules are used for intelligent paring.

In step 630, the currently paired list may be examined to determine if it is empty. If the currently paired list is not empty, in step 635, the list may be sorted. For example, the sorting may be conducted according to the least to most expensive to synchronize, so that a device chosen from the beginning of the list is more likely to be already fully synchronized to the source. A device is already fully synchronized to the source takes less time to pair during provisioning, thus, is more efficient.

After generating the (possibly empty) currently paired list, in step 640, possible pairing devices may be identified from the list of available devices in the group, using the source, the list of currently paired devices, and the list of available devices. In some embodiments, the identification of unrelated but available devices may be conducted by eliminating devices that are not suitable for intelligent pairing. For example, such devices may be the source, devices currently paired to the source, and devices smaller than the source, among others. The remaining devices in the list of available devices are unrelated but available devices for intelligent pairing. Such devices may be paired to the source, but using any of which would require a full synchronization. Such devices, relative to devices in the currently paired devices list may take longer to provision, since a full synchronization takes time. This unrelated but available list is then sorted by size in step 650, from the smallest to largest, so that a device selected from the list is likely to be the same size as the source or not much larger.

Once both lists are constructed, in step 655, one or more target devices may be selected first from the currently paired list. The selected devices may be paired to the source in step 680. If no devices can be selected from the currently paired list, then in step 665, one or more target devices may be selected from the list of available devices. The selected devices may then be paired to the source in step 680. If no devices can be selected from either list, an error message, such as "not enough resources", may be returned in step 675. In some embodiments, if a device is selected from the available list and is currently paired to another source, that pairing may be terminated and the device may be then paired to the given source. Although this may be drastic, it is better to get the backup done than to fail the operation with an error message such as "not enough resources".

Using the intelligent pairing described herein has several benefits. First, traditional approach often requires manual configuration of resources. If the choice of snapshot method is automated using the methods described above and illustrated in FIG. 4, it is impractical to manually configure device pairing for each snapshot. Second, traditional manual configuration has no boundary checks. A manually configured device may not be available for pairing. The intelligent pairing described herein has boundary checks built in places such as the configuration of a storage group, and the usage of rules when selecting available devices for pairing. Such boundary checks reduce the chances of error at run time. Third, using rules, intelligent pairing described herein dynamically determines the best possible target device. For example, the sorting and the composition of two lists allow the selection of the least expensive target device to pair with the source. In other words, a target which was paired with the same source earlier would be faster to synchronize; whereas a target that has not been paired with the source before would take longer to synchronize. Thus, relative to the traditional manual approach, intelligent pairing is more efficient, accurate and reduces the chance of error.

In some embodiments, to make the search for intelligent pairing even more efficient, a lookup database may be used by a backup application. The lookup database may keep the history of earlier mappings and may be queried. A user may manually make changes to it. Alternatively, the information in the database may be updated automatically for each backup. When backup is conducted for the first time, the database may be established. After each backup, the paring information may be recorded to the lookup database. An exemplary table in the lookup database is illustrated in FIG. 7.

Figure 7:
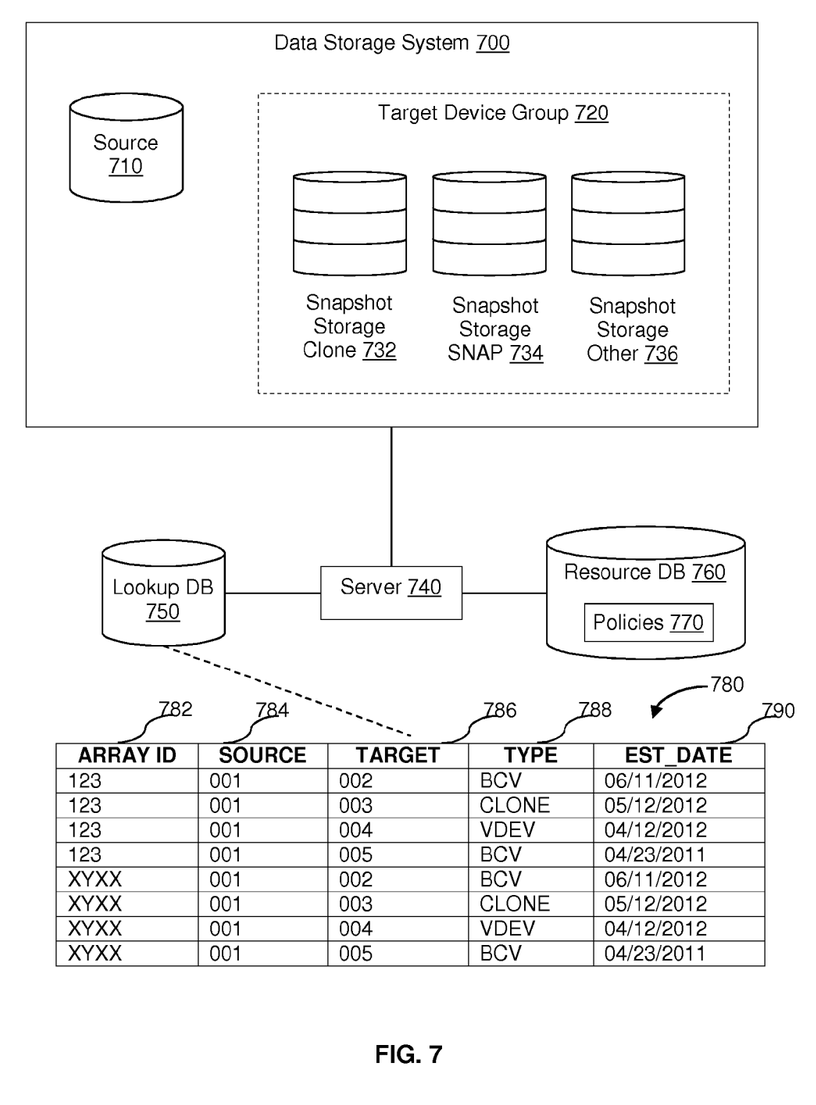
FIG. 7 is a schematic diagram illustrating intelligent pairing using a lookup database for snapshot based backups in accordance with some embodiments.

FIG. 7 is a schematic diagram illustrating intelligent pairing of source and target using a lookup database, in accordance with some embodiments. Lookup Database 750 may include pairing information within Data Storage System 700. Data in Lookup Database 750 may be inserted, updated and/or deleted programmatically and/or manually. Though FIG. 7 illustrates Lookup Database 750 to be external to Server 740, Lookup Database 750 may reside and operate or to be operated inside or outside Server 160. Similarly, though FIG. 7 illustrates Lookup Database 750 to be external to Resource Database 760, Lookup Database 750 may reside and operate or be operated inside or outside Resource Database 760.

In some embodiments, the pairing information of Source 710 and devices in Target Device Group 720 may be recorded in Lookup Database 750. An exemplary table 780 with the pairing information is illustrated in FIG. 7. The exemplary table 780 may include a system identification, such as an array identification 782, a source identification 784, a target identification 786, a type of the target device for pairing 788, and a timestamp recording pairing establishment 790. In the exemplary table 780, two example systems with array ID 123 and XYXX are used in intelligent pairing. At various snapshot backups, different source and target pairing may be established and recorded. For example, on 6 Nov. 2012, one system with array ID 123 and source device ID 001 may be paired with target device 002 for BCV type of snapshot. On the same day, 6 Nov. 2012, another system with array ID XYXX and source device ID 001 may be paired with the same target device 002 also for BCV type of snapshot. If there is a match in the database, the backup application may check if that device is available in Target Device Group 720 and select the validated device for pairing.

In some embodiments, a source may be associated with an array identification and a source identification. The source identification may be a device identification. The search of matching records in the database may be conducted by locating records matching the source and a chosen snapshot method. For example, using the exemplary table 780, the matching may be performed by comparing the array identification and the source identification associated with the source with values in column 782 and 784, and comparing the chosen snapshot method with values in column 788. If a row in table 780 has values equal to the chosen snapshot method and the array identification as well as the source identification associated with source, a matching record is found. If multiple records are found from Lookup Database 750, the application may obtain the recently used, i.e. from EST_DATE column 790 in FIG. 7.

Figure 8:
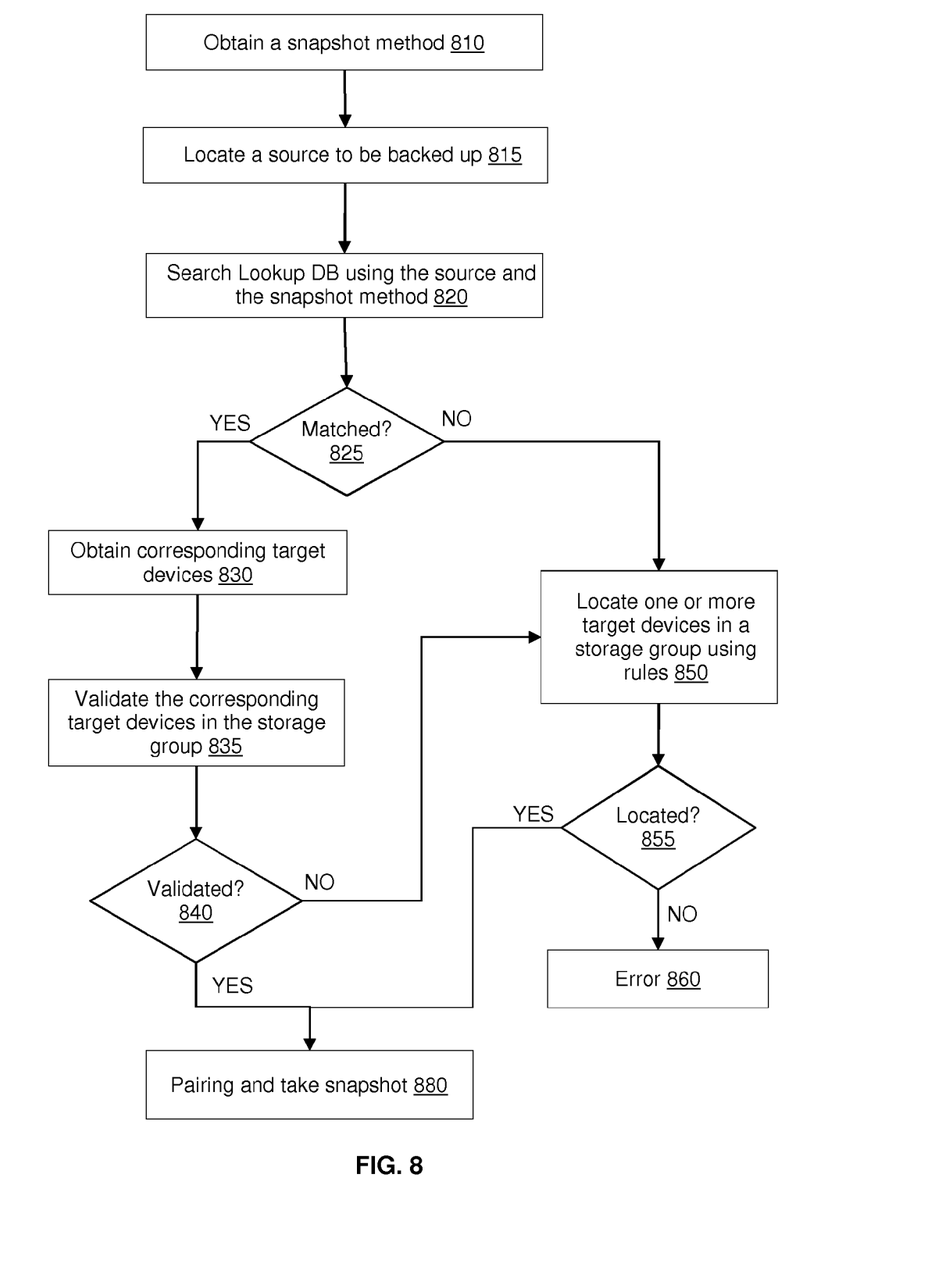
FIG. 8 is a flow chart illustrating a method of intelligent pairing using a lookup database for snapshot based backups in accordance with some embodiments.

FIG. 8 is a flowchart illustrating a method of using a lookup table for intelligent pairing of source and target devices, in accordance with some embodiments. In step 810, a snapshot method may be obtained, for example, using the methods described above and illustrated in FIG. 4. Having intelligently chosen a snapshot method, in step 815, a source to be backed up may be located. In step 820, lookup table may be searched for the source and the snapshot method. For example, in the exemplary table illustrated in FIG. 7, records in the lookup table with source identification matching the source and type value matching the snapshot method may be selected. If such records are located in the lookup table, in step 830, the corresponding target devices in the pairing records may be obtained. If no such pairing records are located in the lookup table, in step 850, one or more target devices may be located in a storage group using the snapshot method. In some embodiments, the method illustrated in FIG. 6 may be used to locate the one or more targeted devices in the storage group and pair the located devices with source. Additional criteria may be specified in the rules used in step 610.

Following step 830, having located records in the lookup table, the corresponding target devices may then be validated in step 835. The validation may be based on rules and by locating the corresponding target devices in a storage group. For example, the rules may require that a corresponding device must be in a storage group, visible, in certain state (ie, ready, not ready), not locked, and/or in an acceptable pair state (ie, split, not paired, etc.) Additional rules, such as the preference for a thin device, may also be built in the validation. The validation may be used to ensure that a potential pairing device located in the lookup table is within the boundary built by the rules and the storage group. A device, although may have been used for intelligent pairing previously and the pairing may have been recorded in the lookup table, may not currently be suitable for pairing for reasons such as not in a storage group, not visible, not in certain state, locked, and/or in an unacceptable pairing state, among others. Thus, the validation is necessary for the boundary check of intelligent pairing.

Once the corresponding target devices are validated, intelligent pairing of source and target may be established and snapshot may be taken in step 880. On the other hand, if the corresponding target devices are invalid according to the rules, in step 850, one or more target devices may be located in a storage group using rules. In some embodiments, the method illustrated in FIG. 6 may be used to locate the one or more targeted devices in the storage group and pair the located devices with source. Additional criteria may be specified in the rules used in step 610. Once target devices are located in the storage group, pairing of source and target may be established and snapshots may be taken in step 880. If following step 850, no target devices may be located, an error message may be given in step 860.

In some embodiments, the intelligent pairing disclosed herein may be used not only at backup time, but also at configuration time. When configuring a new resource or when modifying an existing resource, configuration wizard may invoke intelligent pairing during a dry run exercise, to ensure that the new resource and/or the changes to the resource are unlikely to fail at backup time. This would provide an opportunity for the user to make needed corrections, allocations or configurations prior to attempting a backup.

For example, a user may continue specifying source and target pairing in configuration files. The use of intelligent pairing may be done when the pairing in configuration file fails or when the configuration file does not exist. There will continue to situations where the user will want or need to specify the source and target pairings in the configuration files. Intelligent pairing and configuration files may both be used in a single backup. For instance, the user might want to specify the pairing for a given source by using the configuration files. But when a new source is added and/or when an existing source is updated and the user 'forgot' to add it to the configuration files and/or update it in the configuration files, then intelligent pairing may be used to find a target to pair with it and the backup completes successfully instead of failing inexplicably with "not enough resources." When intelligent pairing is used in place of user specified pairing configuration, the user may be alerted for incorrect or missing configuration.

Figure 9:
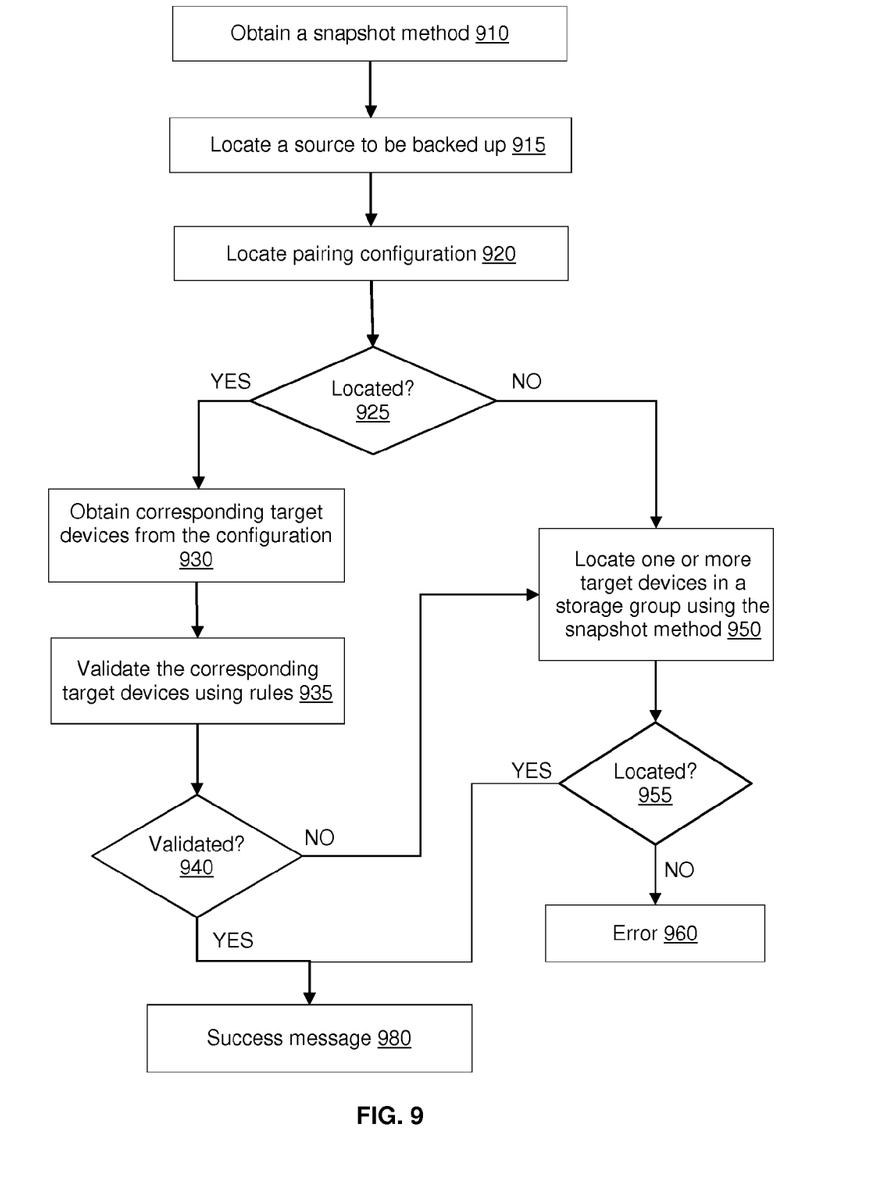
FIG. 9 is a flow chart illustrating a method of intelligent configuration for snapshot based backups in accordance with some embodiments.

FIG. 9 is a flowchart illustrating using intelligent pairing during configuration of snapshot based backups, in accordance with some embodiments. During configuration, after a new resource is added to the system, or after an existing resource has been modified, the pairing between the resource and devices in a storage group may be validated to ensure that devices are snapshot ready. In step 910, a snapshot method may be obtained. In some embodiments, the snapshot method may be specified by a user during configuration. In step 915, a source to be backed up may be obtained. For example, when a new resource is added to a system, a user may select all or some of the filesystems for which he needs to perform the validation. Source LUNs making up the filesystem may then be obtained. In some embodiments, upon obtaining the source, prior to the pairing validation, other validations to ensure the system is snapshot ready may be performed. Such validations may include validating the appropriate OS level and/or software, validating path, and/or validating the availability of volume layout, among others.

In step 920, pairing configuration specified in the system may be obtained. In some embodiments, such configuration may be specified by a user and stored in configuration files. If the pairing configuration is located, in step 930, corresponding target devices for the source may be obtained from the pairing configuration. If no such pairing configuration are located, in step 950, one or more target devices may be located in a storage group. In some embodiments, the method illustrated in FIG. 6 may be used to locate the one or more target devices in the storage group. Additional criteria may be specified in the rules used in step 610.

Following step 930, having located pairing configuration, the corresponding target devices may then be validated in step 935 using rules. For example, the rules may specify criteria requiring a corresponding device must be in a storage group, visible, in certain state (ie, ready, not ready), not locked, and/or in an acceptable pair state (ie, split, not paired, etc.) After examining the attributes of a device, only the device satisfying the criteria may be considered valid. Additional rules, such as the preference for a thin device, may also be built in the validation. The validation may be used to ensure that during a snapshot backup, at least one target device from the storage group is available to be paired with the source using the chosen snapshot method.

Once the corresponding target devices are validated, successful validation message may be given in step 980. On the other hand, if the corresponding target devices are invalid according to the rules, in step 950, one or more target devices may be located in a storage group using rules. In some embodiments, the method illustrated in FIG. 6 may be used to locate the one or more targeted devices in the storage group and pair the located devices with source. Additional criteria may be specified in the rules used in step 610. Once target devices are located in the storage group, successful validation message may be taken in step 980. If following step 950, no target devices may be located, an error message may be given in step 960.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method comprising:
    at a second time instance, calculating a data change rate since a first time instance;
    obtaining policies, wherein each of the policies specifies a backup method and one or more corresponding conditions;
    determining a snapshot method based on the data change rate and the policies; and
    performing a snapshot using the snapshot method, wherein a first policy specifies a first snapshot method to be performed when a first condition is satisfied, the first condition specifying a first data change rate, and wherein a second policy specifies a second snapshot method, different from the first snapshot method, to be performed when a second condition is satisfied, the second condition specifying a second data change rate, different from the first data change rate.

2. The method as recited in claim 1, wherein determining the snapshot method based on the data change rate and the policies comprises:
    finding a policy, wherein the policy has conditions satisfied by the data change rate; and
    obtaining the snapshot method based on the backup method specified by the policy.

3. The method as recited in claim 1, wherein performing the snapshot using the snapshot method comprises:
    pairing a source and one or more targets using the snapshot method;
    producing the snapshot of the source using the snapshot method; and
    storing the snapshot on the one or more targets.

4. The method as recited in claim 1, wherein calculating the data change rate includes calculating the data change rate at filesystem level.

5. The method as recited in claim 1, wherein calculating the data change rate includes calculating the data change rate at block level.

6. A storage system comprising:
    a source;
    a storage group configured to include one or more targets;
    a server configured to back up the source at a plurality of time instances and store backups to at least one target within the storage group;
    a resource database coupled with the server for storing policies, wherein each of the policies specifies a backup method and one or more corresponding conditions, wherein a first policy specifies a first snapshot method to be performed when a first condition is satisfied, the first condition specifying a first data change rate, and wherein a second policy specifies a second snapshot method, different from the first snapshot method, to be performed when a second condition is satisfied, the second condition specifying a second data change rate, different from the first data change rate; and
    a backup application executed by the server configured to calculate a data change rate between two time instances among the plurality of time instances, obtain the policies from the resource database, determine a snapshot method based on the data change rate and the policies, and perform a snapshot using the snapshot method.

7. The system as recited in claim 6, wherein the system provides a user interface providing one or more criteria containing the backup method and the one or more corresponding conditions of the policies, wherein a selection of a criteria results in storing one or more policies in the resource database.

8. The system as recited in claim 6, wherein the storage group includes the source.

9. The system as recited in claim 6, wherein the source includes a plurality of sources.

10. A computer program product comprising a non-transitory computer usable medium having machine readable code embodied therein for:
    at a second time instance, calculating a data change rate indicating an amount of data that has changed since a first time instance;
    obtaining policies, wherein each of the policies specifies a backup method and one or more corresponding conditions, wherein a first policy specifies a first snapshot method to be performed when a first corresponding condition comprising a first data change rate is satisfied, and wherein a second policy specifies a second snapshot method, different from the first snapshot method, to be performed when a second corresponding condition comprising a second data change rate, different from the first data change rate, is satisfied;
    determining whether the data change rate satisfies the first or second corresponding condition;
    if the data change rate satisfies the first corresponding condition, selecting the first snapshot method to be performed;

if the data change rate satisfies the second corresponding condition, selecting the second snapshot method to be performed; and performing a snapshot using the selected snapshot method.

11. A method comprising;

at a second time instance, calculating a data change rate since a first time instance;

obtaining policies, wherein each of the policies specifies a backup method and one or more corresponding conditions;

determining a snapshot method based on the data change rate and the policies; and performing a snapshot using the snapshot method, wherein a first policy specifies a first snapshot method and a corresponding first condition, the first condition specifying a first maximum amount of data that is allowed to be changed for the first condition to be satisfied, wherein a second policy specifies a second snapshot method, different from the first snapshot method, and wherein the determining a snapshot comprises:

determining whether the data change rate is below the first maximum amount of data that is allowed to be changed for the first condition to be satisfied;

if the data change rate is below the first maximum amount, selecting the first snapshot method as the snapshot method to be performed; and if the data change rate is above the first maximum amount, selecting the second snapshot method as the snapshot method to be performed.

12. A method comprising:

at a second time instance, calculating a data change rate since a first time instance;

obtaining policies, wherein each of the policies specifies a backup method and one or more corresponding conditions;

determining a snapshot method based on the data change rate and the policies; and performing a snapshot using the snapshot method, wherein a first policy specifies a first snapshot method and a corresponding first condition, the first condition specifying a first minimum amount of data that must be changed for the first condition to be satisfied, wherein a second policy specifies a second snapshot method, different from the first snapshot method, and wherein the determining a snapshot comprises:

determining whether the data change rate is above the first minimum amount of data that must be changed for the first condition to be satisfied;

if the data change rate is above the first minimum amount, selecting the first snapshot method as the snapshot method to be performed; and if the data change rate is below the first minimum amount, selecting the second snapshot method as the snapshot method to be performed.

13. A method comprising;

at a second time instance, calculating a data change rate since a first time instance;

obtaining policies, wherein each of the policies specifies a backup method and one or more corresponding conditions;

determining a snapshot method based on the data change rate and the policies; and performing a snapshot using the snapshot method, wherein a first policy specifies a first snapshot method to be performed when a first corresponding condition comprising a first data change rate is satisfied, and wherein a second policy specifies a second snapshot method, different from the first snapshot method, to be performed when a second corresponding condition comprising a second data change rate, different from the first data change rate, is satisfied, and the determining a snapshot method comprises:

determining whether the data change rate satisfies the first or second corresponding condition;

if the data change rate satisfies the first condition, selecting the first snapshot method to perform; and if the data change rate satisfies the second condition, selecting the second snapshot method to perform.

14. A method comprising;

at a second time instance, calculating a data change rate since a first time instance;

obtaining policies, wherein each of the policies specifies a backup method and one or more corresponding conditions;

determining a snapshot method based on the data change rate and the policies; and performing a snapshot using the snapshot method, wherein a first policy specifies a first snapshot method and a corresponding first condition, the first condition specifying a first minimum amount of data that must be changed and a first maximum amount of data allowed to be changed for the first condition to be satisfied, and wherein a second policy specifies a second snapshot method, different from the first snapshot method, and a corresponding second condition, different from the first condition, and the method comprises:

determining whether the data change rate falls between the first minimum amount and the first maximum amount;

if the data change rate falls between the first minimum amount and the first maximum amount, selecting the first snapshot method to perform; and if the data change rate falls outside the first minimum amount and the first maximum amount, selecting the second snapshot method to perform.

15. The method of claim 13, wherein determining the snapshot method based on the data change rate and the policies comprises:

finding a policy, wherein the policy has conditions satisfied by the data change rate; and obtaining the snapshot method based on the backup method specified by the policy.

16. The method of claim 13, wherein performing the snapshot using the snapshot method comprises:

pairing a source and one or more targets using the snapshot method;

producing the snapshot of the source using the snapshot method; and storing the snapshot on the one or more targets.

17. The method of claim 13, wherein calculating the data change rate includes calculating the data change rate at filesystem level.

18. The method of claim 13, wherein calculating the data change rate includes calculating the data change rate at block level.

19. The method of claim 11, wherein calculating the data change rate includes calculating the data change rate at filesystem level.

20. The method of claim 12, wherein calculating the data change rate includes calculating the data change rate at block level.

* * * * *